(12) United States Patent
Sinai

(10) Patent No.: US 7,546,140 B2
(45) Date of Patent: Jun. 9, 2009

(54) DEVICE, SYSTEM AND METHOD FOR MULTI-PROFILE WIRELESS COMMUNICATION

(75) Inventor: David Sinai, Petach-Tiqva (IL)

(73) Assignee: Marvell International Ltd., Hamilton (BM)

( * ) Notice: Subject to any disclaimer, the term of this patent is extended or adjusted under 35 U.S.C. 154(b) by 820 days.

(21) Appl. No.: 10/879,482

(22) Filed: Jun. 30, 2004

(65) Prior Publication Data

US 2006/0003802 A1 Jan. 5, 2006

(51) Int. Cl.
*H04M 1/00* (2006.01)
(52) U.S. Cl. .................. 455/552.1; 455/553.1; 455/88; 455/90.1
(58) Field of Classification Search ............. 455/550.1, 455/83, 85, 88, 552.1, 553.1, 556.1, 557, 455/90.1–90.2, 78; 379/93.01, 93.05, 93.15
See application file for complete search history.

(56) References Cited

U.S. PATENT DOCUMENTS

| | | | | |
|---|---|---|---|---|
| 5,422,931 A * | 6/1995 | Austin-Lazarus et al. | 455/553.1 |
| 6,058,316 A * | 5/2000 | Takahashi | ................ | 455/552.1 |
| 6,115,466 A * | 9/2000 | Bella | ..................... | 379/399.01 |
| 6,643,522 B1 * | 11/2003 | Young | ..................... | 455/552.1 |
| 2003/0081741 A1 * | 5/2003 | Anne et al. | .............. | 379/93.01 |
| 2006/0252464 A1 * | 11/2006 | Vander Veen et al. | ....... | 455/567 |

* cited by examiner

*Primary Examiner*—John J Lee

(57) ABSTRACT

Briefly, some embodiments of the invention may provide devices, systems and methods for multi-profile wireless communication. For example, a wireless communication module may include first and second ports, and may be able to selectably operate in either a first mode of operation, in which said first port is used as an input port for incoming signals and said second port is used as an output port for outgoing signals, or a second mode of operation, in which said second port is used as an input port for incoming signals and said first port is used as an output port for outgoing signals.

4 Claims, 4 Drawing Sheets

DEVICE, SYSTEM AND METHOD FOR MULTI-PROFILE WIRELESS COMMUNICATION

BACKGROUND OF THE INVENTION

In the field of wireless communications, a wireless communication terminal may support a plurality of wireless communication profiles, for example, a plurality of profiles in accordance with Bluetooth (RTM) specification, e.g., cordless telephony profile, intercom profile, or cellular profile. To accommodate a plurality of profiles, the wireless communication terminal may require, for example, multiple internal physical connections or additional software and/or hardware components to internally route data to intended destinations and perform desired functions associated with the multiple profiles. Additionally, a processor used by such multi-profile communication terminal may require physical adaptation, e.g., additional pins, balls or peripherals. Due to these and other changes, the power consumption of a multi-profile communication terminal may be relatively high compared to single profile devices.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
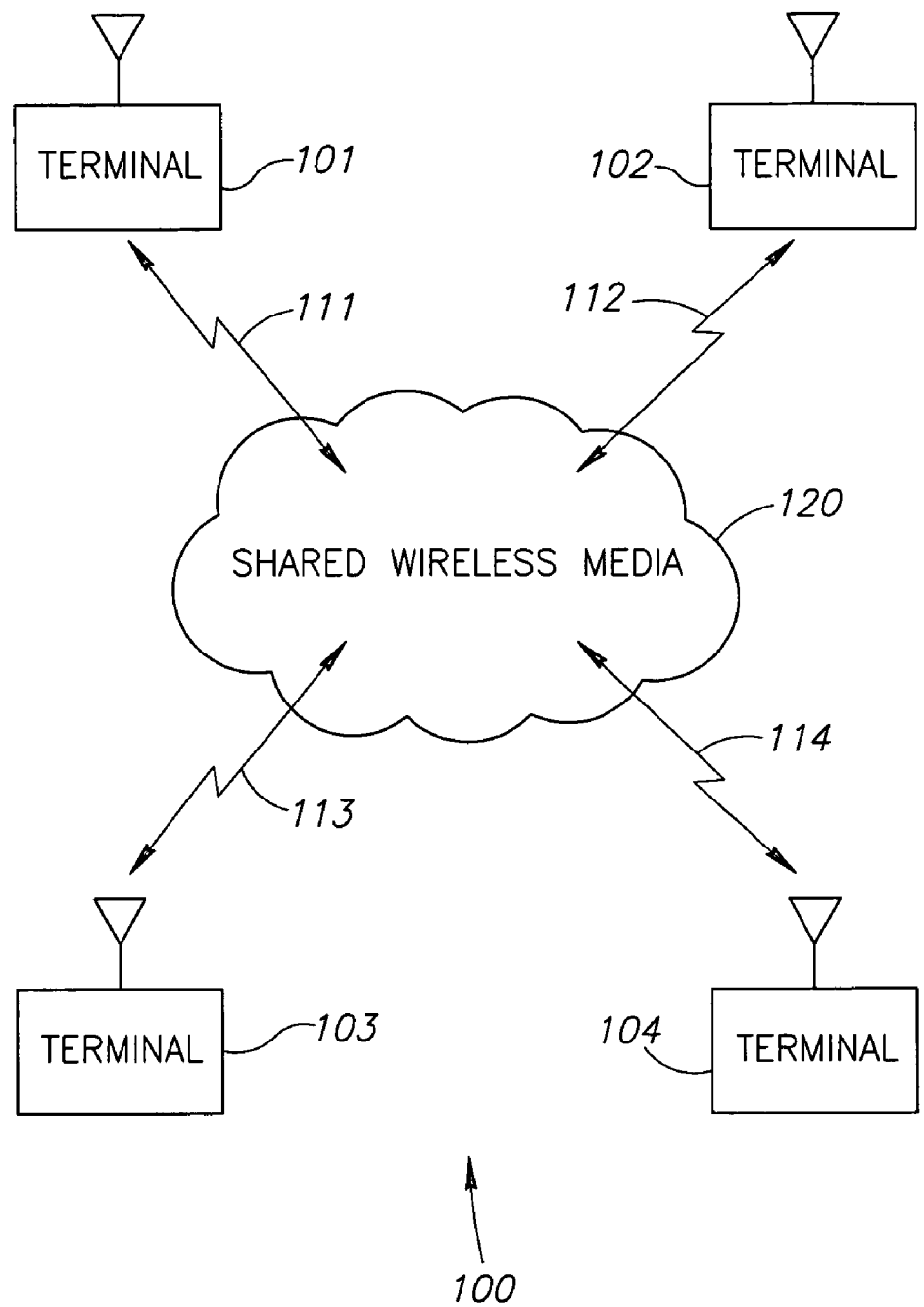
FIG. 1 is a schematic illustration of a block diagram of a wireless communication system having a wireless communication terminal able to support multi-profile communications in accordance with exemplary embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

It should be understood that embodiments of the invention may be used in a variety of applications. Although the invention is not limited in this respect, embodiments of the invention may be used in conjunction with many apparatuses, for example, a transmitter, a receiver, a transceiver, a transmitter-receiver, a wireless communication station, a wireless communication device, a wireless Access Point (AP), a modem, a wireless modem, a personal computer, a desktop computer, a mobile computer, a laptop computer, a notebook computer, a Personal Digital Assistant (PDA) device, a tablet computer, a server computer, a network, a Local Area Network (LAN), a Wireless LAN (WLAN), devices and/or networks operating in accordance with existing 802.11, 802.11a, 802.11b, 802.11g, 802.11n, 802.16, Wireless Fidelity (Wi-FI) and/or WiMAX standards and/or future versions of the above standards, devices and/or networks operating in accordance with Bluetooth (RTM) specification, devices and/or networks operating in accordance with Voice Over Internet Protocol (VoIP), devices and/or networks operating in accordance with VoIP and 802.11 or 802.16 standards, a Personal Area Network (PAN), Wireless PAN (WPAN), units and/or devices which are part of the above WLAN and/or PAN and/or WPAN networks, one way and/or two-way radio communication systems, a cellular radio-telephone communication system, a cellular telephone, a wireless telephone, a Personal Communication Systems (PCS) device, a PDA device which incorporates a wireless communication device, or the like. It is noted that embodiments of the invention may be used in various other apparatuses, devices, systems and/or networks.

FIG. 1 schematically illustrates a block diagram of a wireless communication system 100 having a wireless communication terminal able to support multi-profile communications in accordance with exemplary embodiments of the invention. System 100 may include one or more wireless communication terminals, for example, terminals 101, 102, 103 and 104.

Terminal 101, terminal 102, terminal 103 and/or terminal 104 may communicate among themselves over a shared wireless media 120, which may include, for example, wireless communication links 111, 112, 113 and 114. For example, terminal 101 may communicate with one or more other terminals of system 100 through link 111, terminal 102 may communicate with one or more other terminals of system 100 through link 112, terminal 103 may communicate with one or more other terminals of system 100 through link 113, and terminal 104 may communicate with one or more other terminals of system 100 through link 114.

In some embodiments, terminal 101 may support a plurality of wireless communication profiles, or a plurality of modes of operation which may correspond to a plurality of communication profiles. For example, terminal 101 may communicate with terminal 102 in accordance with cordless telephony profile, with terminal 103 in accordance with intercom profile, and/or with terminal 104 in accordance with cellular profile. In an alternate embodiment, for example, terminal 101 may communicate with one or more of terminals 102-104 using VoIP in accordance with 802.11 and/or 802.16 standards.

In accordance with some embodiments of the invention, terminal 101 may include connections, ports or sockets which may be able to modify, switch or swap their functionalities, for example, to allow terminal 101 to efficiently support a plurality of wireless communication profiles and/or to allow terminal 101 to efficiently switch between a first wireless communication profile to a second wireless communication profile as described in detail herein.

Figure 2:
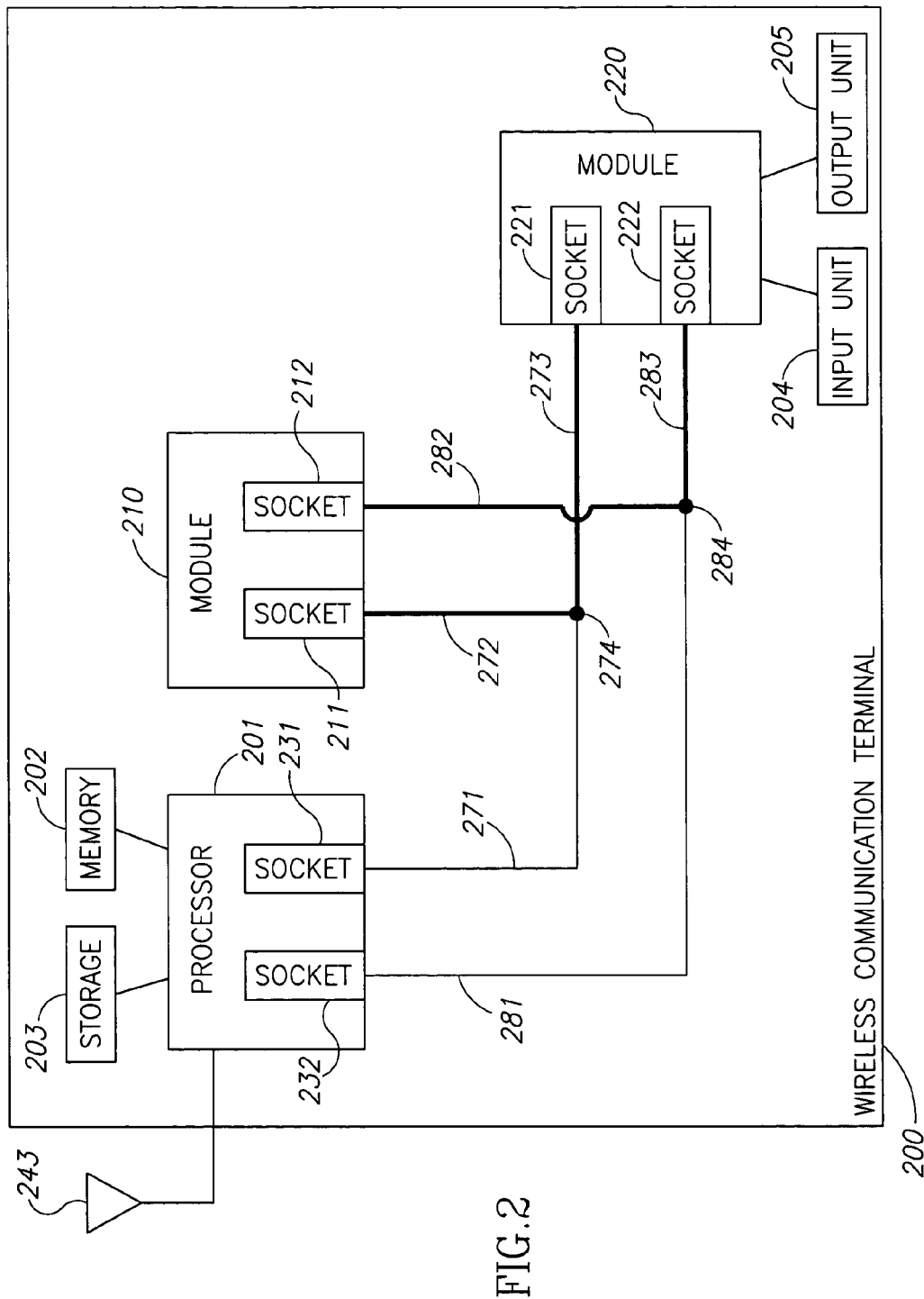
FIG. 2 is a schematic illustration of a block diagram of a single-processor wireless communication terminal able to support a plurality of wireless communication profiles in accordance with exemplary embodiments of the invention.

FIG. 2 schematically illustrates a block diagram of a single-processor wireless communication terminal 200 able to support a plurality of wireless communication profiles in accordance with exemplary embodiments of the invention.

Terminal 200 may be an example of terminal 101. Terminal 200 may include, for example, a processor 201, a memory unit 202, an optional storage unit 203, an input unit 204, an output unit 205, and an antenna 243. Terminal 200 may further include one or more codecs or modules, for example, modules 210 and 220.

Processor 201 may include, for example, a Central Processing Unit (CPU), a Digital Signal Processor (DSP), a microprocessor, a controller, a chip, a microchip, or any other suitable multi-purpose or specific processor or controller. Processor 201 may, for example, process data and/or signals transmitted and/or received by terminal 200.

Memory unit 202 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units. Memory unit may, for example, store data transmitted and/or received by terminal 200 or used by processor 201.

Storage unit 203 may include, for example, a hard disk drive, a floppy disk drive, a Compact Disk (CD) drive, a CD-Recordable (CD-R) drive, or other suitable removable and/or fixed storage unit. In some embodiments, for example, when terminal 200 is implemented as a computing platform, a computer, a laptop computer or a mobile computer, storage unit 203 may store for long periods of time various files or data transmitted and/or received by terminal 200 or used by processor 201.

Antenna 243 may include an internal and/or external Radio Frequency (RF) antenna. In some embodiments, for example, antenna 243 may include a dipole antenna, a monopole antenna, an omni-directional antenna, an end fed antenna, a circularly polarized antenna, a micro-strip antenna, a diversity antenna, or any other type of antenna or a plurality of antennas suitable for sending and/or receiving wireless communication signals, blocks, frames, packets, messages, files and/or data.

Input unit 204 may include, for example, a keypad, a keyboard, one or more keys, a touchpad, a joystick, a mouse, a pointing device, a user interface, one or more buttons, one or more switches, one or more sliders, or other suitable input component. In some embodiments, input unit 204 may input a suitable audio input component, e.g., an internal or external microphone, and/or a suitable video input component, e.g., an internal or external photo camera or a video camera. In one embodiment, for example, input unit 204 may be used by a user to modify the operation of terminal 200, e.g., from operating in a first mode of operation in accordance with a first communication profile to operating in a second mode of operation in accordance with a second communication profile.

Output unit 205 may include, for example, a screen or monitor. In some embodiments, output unit 204 may include a suitable audio output component, e.g., one or more speakers, earphones or headphones.

Module 210 and/or module 220 may include, for example, one or more suitable wireless communication modules, models or codecs, and may be implemented using hardware components and/or software components. Module 210 and/or module 220 may include, for example, a Bluetooth (RTM) module, a Wireless Fidelity (Wi-Fi) module, a 802.11 module, a 802.11a module, a 802.11b module, a 802.11g module, a 802.11n module, a Wi-MAX module, a 802.16 module, a wireless LAN module, a module or codec able to support cordless telephony profile, a module or codec able to support intercom profile, a module or codec able to support cellular profile, or other suitable modules or codecs. In one embodiment, for example, module 210 may include a Bluetooth (RTM) module, and module 220 may include a cellular voice codec.

It will be appreciated that the term "socket" as used herein may include, for example, any suitable port, connector, connection, plug, pin, ball, exit socket, entry socket, "in" socket, "out" socket, transmitter socket, receiver socket, or other connector able to receive or transmit data or signals. It will be appreciated that the term "link" as used herein may include, for example, one or more cables, wires, connectors, conductors, wired links, wireless links, or the like.

Module 210 may include one or more sockets, for example sockets 211 and 212. When terminal 200 operates in accordance with a first wireless communication profile, socket 211 may operate as an input socket able to receive input signals provided to module 210 for processing, and socket 212 may operate as an output socket able to provide output signals produced by module 210. In accordance with some embodiments of the invention, when terminal 200 operates in accordance with a second wireless communication profile, the functionality of sockets 211 and 212 may be swapped or switched such that socket 212 may operate as an input socket able to receive input signals provided to module 210 for processing, and socket 211 may operate as an output socket able to provide output signals produced by module 210.

In some embodiments, the switching may be performed by module 210, by processor 201, or by a dedicated switching unit which may be a component of terminal 210, of processor 201 or of module 210. In one embodiment, a need to perform the switching may be detected, for example, by module 210. In another embodiment, a need to perform the switching may be detected, for example, by processor 201, which may send to module 210 a signal, a message, a header, a data item, a data block or a packet indicating a need, a request or a command to perform the switching, such that module 210 may receive the signal and perform the switching accordingly. In one embodiment, the switching may be performed in response to a processor-generated command to switch, e.g., a signal received from processor 201 indicating a request to perform the switching. In another embodiment, the switching may be performed in response to a request to switch triggered or manually commanded by a user of terminal 200, e.g., a user-generated or user-triggered command to switch entered by a user through a keypad, a button, a switch or a user interface included in terminal 200, e.g., using input unit 204.

Similarly, module 220 may include one or more sockets, for example sockets 221 and 222. When terminal 200 operates in accordance with a first wireless communication profile, socket 221 may operate as an input socket able to receive input signals provided to module 220 for processing, and socket 222 may operate as an output socket able to provide output signals produced by module 220. In accordance with some embodiments of the invention, when terminal 200 operates in accordance with a second wireless communication profile, the functionality of sockets 221 and 222 may be swapped or switched such that socket 222 may operate as an input socket able to receive input signals provided to module 220 for processing, and socket 221 may operate as an output socket able to provide output signals produced by module 220.

In some embodiments, the switching may be performed by module 220, by processor 201, or by a dedicated switching unit which may be a component of terminal 220, of processor 201 or of module 220. In one embodiment, a need to perform the switching may be detected, for example, by module 220.

In another embodiment, a need to perform the switching may be detected, for example, by processor 201, which may send to module 220 a signal indicating a need, a request or a command to perform the switching, such that module 220 may receive the signal and perform the switching accordingly. In one embodiment, the switching may be performed in response to a processor-generated command to switch, e.g., a signal received from processor 201 indicating a request to perform the switching. In another embodiment, the switching may be performed in response to a request to switch triggered or manually commanded by a user of terminal 200, e.g., a user-generated or user-triggered command to switch entered by a user through a keypad, a button, a switch or a user interface included in terminal 200.

In some embodiments, module 210 may be directly connected to module 220 using one or more links. For example, socket 211 of module 210 may be connected to socket 221 of module 220 using links 272 and 273, and socket 212 of module 210 may be connected to socket 222 of module 220 using links 282 and 283.

It will be appreciated that in some embodiments, the connections between module 210 and 220 may be swapped in comparison to a connection of modules used in some conventional terminals. For example, in some embodiments, when socket 211 of module 210 operates as an input socket and socket 221 of module 220 operates as an output socket, sockets 211 and 221 may be connected using links 272 and 273. Similarly, when socket 211 of module 210 operates as an output socket and socket 221 of module 220 operates as an input socket, sockets 211 and 221 may be connected using links 272 and 273. Similarly, in some embodiments, when socket 212 of module 210 operates as an input socket and socket 222 of module 220 operates as an output socket, sockets 212 and 222 may be connected using links 282 and 283; and when socket 212 of module 210 operates as an output socket and socket 222 of module 220 operates as an input socket, sockets 212 and 222 may be connected using links 282 and 283.

In some embodiments, processor 201 may include one or more pins or sockets, e.g., sockets 231 and 232, through which processor 201 may be connected to modules 210 and/or 220. In accordance with some embodiments, sockets 231 and 232 of processor 201 may suffice to operatively connect processor 201 to both module 210 and module 220. For example, in one embodiment, socket 231 of processor 201 may be connected through a link 271 to a node 274, which may be connected through link 272 to socket 211 of module 210 and through link 273 to socket 221 of module 220. Similarly, socket 232 of processor 201 may be connected through a link 281 to a node 284, which may be connected through link 282 to socket 212 of module 210 and through link 283 to socket 222 of module 220.

In some embodiments, processor 201 may be adapted or configured to control module 210 and/or module 220, e.g., for processing data produced by module 210 and/or module 220, or for modifying a functionality of module 210, module 220, socket 211, socket 212, socket 221 and/or socket 222. For example, processor 201 may be adapted to determine that there is a need to modify the operation of terminal 200, e.g., from operation in accordance with a first wireless communication profile to operation in accordance with a second wireless communication profile. This modification may be performed, for example, upon receiving a request by a user to modify the active wireless communication profile, or when processor 201 determines that it may be beneficial to modify the active wireless communication profile, or when one or more pre-defined conditions are met. In accordance with some embodiments of the invention, the modification may include, for example, swapping the functionality of one or more sockets of modules 210 and/or 220. For example, processor 201 may determine that module 210 may be activated, and socket 211 of module 210 may modify its operation from an input socket to an output socket while socket 212 of module 210 may modify its operation from an output socket to an input socket, or vice versa. Similarly, processor 201 may determine that module 220 may be de-activated, and socket 221 of module 220 may modify its operation from an input socket to an output socket while socket 222 of module 220 may modify its operation from an output socket to an input socket, or vice versa. In some embodiments, processor 201 may use links 271 and/or 281 to otherwise activate or de-activate modules 210 and/or 220, to pause or suspend or halt the operation of modules 210 and/or 220, to ensure that exactly one of modules 210 and 220 is operational, to bring modules 210 and/or 220 into an idle mode or an active mode, or the like.

It will be appreciated that although one processor 201 and two modules 210 and 220 are shown in FIG. 2, embodiments of the invention are not limited in this regard, and may include, for example, a plurality of processors and/or a plurality of communication modules. In some embodiments, such communication modules may include various other communication modules having first and second ports and able to selectably or selectively operate in one of a first mode of operation, in which said first port is used as an input port for incoming signals and said second port is used as an output port for outgoing signals, and a second mode of operation, in which said second port is used as an input port for incoming signals and said first port is used as an output port for outgoing signals.

It will be appreciated that in one embodiment, module 210 and/or module 220 may be able to switch from operating in a first mode of operation to operating in a second mode of operation; in an alternate embodiment, the switch may be performed using processor 201 or using a dedicated controller or a switching unit, which may be embedded as software component and/or hardware component in module 210, module 220, processor 201 or terminal 200. In some embodiments, module 210, module 220 and/or processor 201 may be able to detect a need to perform said switch, or to send and receive signals indicating a need to perform said switch.

It will be appreciated that in some embodiments, the architecture of terminal 200 may allow, for example, a reduction in the amount of internal links and/or physical lines in terminal 200, a reduction in the number of pins, balls and/or peripherals of processor 201 used for interfacing with module 210 and/or module 220, eliminating a need to activate or otherwise "awake" processor 201 to route or divert signals or data from or to modules 210 and/or 220, and/or a decrease in power consumption of terminal 200. In some embodiments, the architecture of terminal 200 may obviate the need for additional software or hardware components to internally route data within terminal 200. In some embodiments, the architecture of terminal 200 may obviate the need for an additional module or codec, for example, a secondary voice codec.

Figure 3:
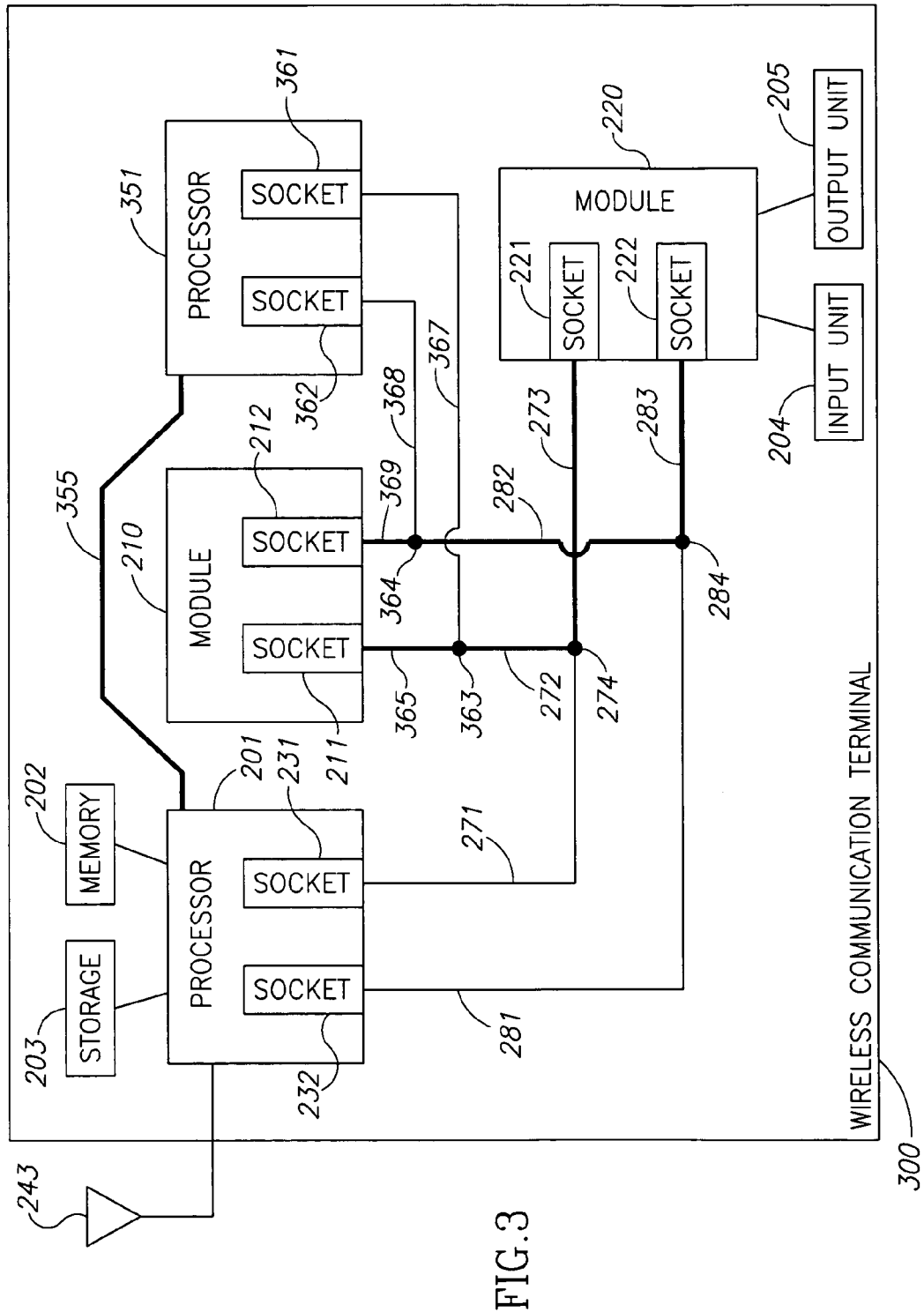
FIG. 3 is a schematic illustration of a block diagram of a dual-processor wireless communication terminal able to support a plurality of wireless communication profiles in accordance with exemplary embodiments of the invention.

FIG. 3 schematically illustrates a block diagram of a dual-processor wireless communication terminal 300 able to support a plurality of wireless communication profiles in accordance with exemplary embodiments of the invention. Terminal 300 may be an example of terminal 101. Terminal 300 may include components similar to the components of terminal 200, yet instead of having one processor 201 as in terminal 200, terminal 300 may include a plurality of processors, for example, processors 201 and 351.

In some embodiments, for example, processor 201 of terminal 300 may include an application-side processor, and processor 351 may include a communication-side processor. Processors 201 and 351 may be interconnected, for example, through a serial link 355.

In some embodiments, processor 351 may include one or more pins or sockets, e.g., sockets 361 and 362, through which processor 351 may be connected to modules 210 and/or 220. In accordance with some embodiments, sockets 361 and 362 of processor 201 may suffice to operatively connect processor 351 to both module 210 and module 220. For example, in one embodiment, socket 361 of processor 351 may be connected through a link 367 to a node 363, which may be connected through link 365 to socket 211 of module 210 and through links 272 and 273 to socket 221 of module 220. Similarly, socket 362 of processor 351 may be connected through a link 368 to a node 364, which may be connected through a link 369 to socket 212 of module 210 and through links 283 and 283 to socket 222 of module 220.

In some embodiments, processor 201 and/or processor 351 may be adapted or configured to control module 210 and/or module 220, e.g., for processing data produced by module 210 and/or module 220, or for modifying a functionality of module 210, module 220, socket 211, socket 212, socket 221 and/or socket 222. For example, processor 201 and/or processor 351 may be adapted to determine that there is a need to modify the operation of terminal 300, e.g., from operation in accordance with a first wireless communication profile to operation in accordance with a second wireless communication profile.

The modification may be performed, for example, upon receiving a request by a user to modify the active wireless communication profile, or when processor 201 and/or processor 351 determine that it may be beneficial to modify the active wireless communication profile, or when one or more pre-defined conditions are met. In accordance with some embodiments of the invention, the modification may include, for example, swapping or switching the functionality of one or more sockets of modules 210 and/or 220. For example, processor 201 and/or processor 351 may determine that module 210 may be activated, and socket 211 of module 210 may modify its operation from an input socket to an output socket while socket 212 of module 210 may modify its operation from an output socket to an input socket, or vice versa. Similarly, processor 201 and/or processor 351 may determine that module 220 may be de-activated, and socket 221 of module 220 may modify its operation from an input socket to an output socket while socket 222 of module 220 may modify its operation from an output socket to an input socket, or vice versa. In some embodiments, processor 201 and/or processor 351 may use links 271, 281, 367 and/or 368 to otherwise activate or de-activate modules 210 and/or 220, to pause or suspend or halt the operation of modules 210 and/or 220, to ensure that only one of modules 210 and 220 is operational, to bring modules 210 and/or 220 into an idle mode or an active mode, to send to module 210 and/or module 220 a request or command to switch operation or to switch sockets functionality, or the like.

It will be appreciated that although two processors 201 and 351 and two modules 210 and 220 are shown in FIG. 3, embodiments of the invention are not limited in this regard, and may include, for example, a plurality of processors and/or a plurality of wireless communication modules.

It will be appreciated that in some embodiments, the architecture of terminal 300 may allow, for example, a reduction in the amount of internal links and/or physical lines in terminal 300, a reduction in the number of pins or balls of processor 201 and/or processor 351 used for interfacing with module 210 and/or module 220, eliminating a need to activate or otherwise "awake" processor 201 and/or processor 351 to route or divert signals or data from or to modules 210 and/or 220, and/or a decrease in power consumption of terminal 300. In some embodiments, the architecture of terminal 300 may obviate the need for additional software or hardware components to internally route data within terminal 300. In some embodiments, the architecture of terminal 300 may obviate the need for an additional module or codec, for example, a secondary voice codec.

Figure 4:
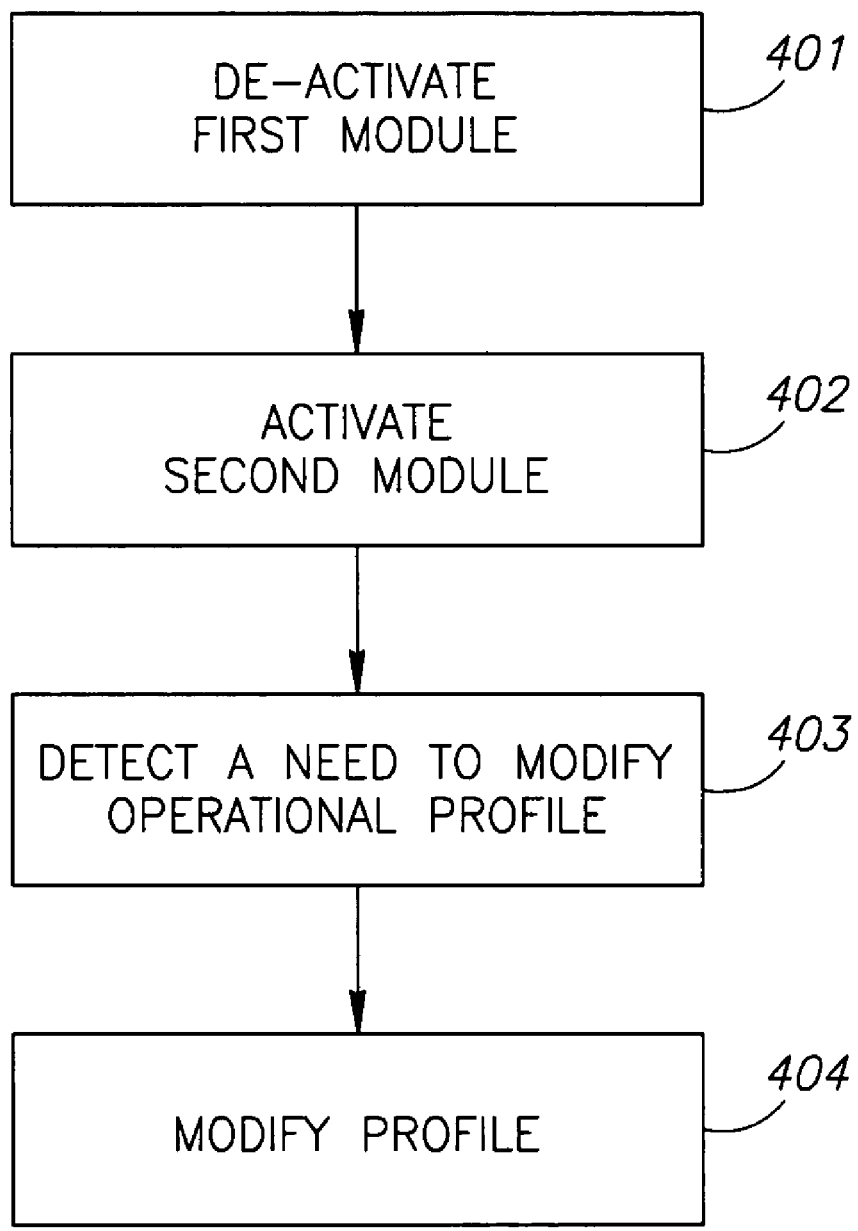
FIG. 4 is a schematic flow-chart of a method of communicating using a wireless communication terminal able to support a plurality of wireless communication profiles in accordance with exemplary embodiments of the invention.

FIG. 4 is a schematic flow-chart of a method of communicating using a wireless communication terminal able to support a plurality of wireless communication profiles in accordance with exemplary embodiments of the invention. The method may be used, for example, by terminal 101 of FIG. 1, terminal 200 of FIG. 2, terminal 300 of FIG. 3, or by other suitable wireless communication terminals, devices, stations, systems and/or networks.

As indicated at box 401, the method may include de-activating a first wireless communication module in the wireless communication terminal. For example, module 210 may include a Bluetooth (RTM) module, which may be de-activated when a user uses terminal 200 as a cellular communication device and/or when module 220 is active. In some embodiments, the de-activation of module 210 may include, for example, powering down of module 210 and/or tri-stating one or more outputs of module 210.

As indicated at box 402, the method may include activating a second wireless communication module or codec in a wireless communication terminal. For example, module 220 of terminal 200 may include a cellular telephony codec, and may be activated when a user uses terminal 200 as a cellular communication device.

It is noted that in one embodiment, the de-activation of box 401 and the activation of box 402 may be performed substantially simultaneously. In an alternate embodiment, the de-activation of box 401 may be performed after the activation of box 402.

As indicated at box 403, the method may include detecting a need to modify the operational wireless communication profile of a wireless communicating terminal. For example, the user of terminal 200 may wish to stop using terminal 200 as a cellular communication device and to begin using terminal 200 as a cordless telephone, e.g., when the user of terminal 200 is in proximity to a cordless base station able to communicate with terminal 200 using a wireless cordless profile, or in a range in which it may beneficial to switch from a first mode of operation to a second mode of operation. In some embodiments, the need may be detected, for example, when the user of terminal 200 requests to modify the operational wireless communication profile, or when processor 201 detects that the operational wireless communication profile may be modified. In some embodiments, the need may be detected, for example, by processor 201, by processor 351, by module 210 and/or by module 220. In one embodiment, for example, processor 201 may receive, may generate and/or may send a signal indicating a command to switch or a request to switch.

As indicated at box 404, the method may include modifying an operational wireless communication profile of a wireless communication terminal, for example, by modifying, swapping or switching a functionality of one or more sockets of one or more modules or codecs of the wireless communication terminal. For example, if cellular telephony codec 220 is operational and Bluetooth (RTM) module 210 is not operational, then cellular telephony codec 220 may be de-activated and Bluetooth (RTM) module 210 may be activated. In some embodiments, for example, socket 211 of module 210 may switch its operation from an input socket to an output socket while socket 212 of module 210 may switch its operation from an output socket to an input socket, or vice versa. In one embodiment, substantially simultaneously, socket 221 of module 220 may switch its operation from an input socket to an output socket while socket 222 of module 220 may switch its operation from an output socket to an input socket, or vice versa. In some embodiments, this may result in switching the operation of terminal 200 from operation in accordance with a cellular telephone profile to operation in accordance with a cordless telephone profile. Other suitable operations may be used to switch one or more sockets of one or more wireless communication modules from operating as an input socket to operating as an output socket, or vice versa.

Other suitable operations or sets of operations may be used in accordance with embodiments of the invention.

Although part of the discussion herein relates, for exemplary purposes, to a wireless communication terminal, embodiments of the present invention are not limited in this regard, and may be used in conjunction with various other devices and systems. For example, embodiments of the invention may be used in conjunction with a computing platform, a desktop computer, a mobile computer, a laptop computer, a server computer, or a PDA device, which may include a first communication module corresponding to a first communication profile and a second communication module corresponding to a second communication profile, wherein the first and second communication profiles are selected from a group including cordless telephony profile, intercom profile, cellular profile, Bluetooth (RTM) profile, Voice Over Internet Protocol profile, Wireless Local Area Network profile, Wireless Fidelity profile, and WiMAX profile. For example, one or more of such communication modules may have first and second ports, and may be able to selectably operate in either a first mode of operation, in which said first port is used as an input port for incoming signals and said second port is used as an output port for outgoing signals, or a second mode of operation, in which said second port is used as an input port for incoming signals and said first port is used as an output port for outgoing signals Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by terminal 101, by terminal 200, by terminal 300, by processor 201, by processor 351, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory units 202 or 302), memory device, memory article, memory medium, storage device, storage article, storage medium and/or storage unit (e.g., storage units 203 or 303), for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication terminal comprising:
    an antenna to send and receive wireless communication signals; and
    two or more wireless communication modules having first and second ports, at least one of said two or more wireless communication modules having first and second ports and able to selectably operate in either a first mode of operation, in which said first port is used as an input port for incoming signals and said second port is used as an output port for outgoing signals, or a second mode of operation, in which said second port is used as an input port for incoming signals and said first port is used as an output port for outgoing signals.

2. The wireless communication terminal of claim 1, further comprising a processor to switch said two or more wireless communication modules between said first mode of operation and said second mode of operation.

3. The wireless communication terminal of claim 1, wherein said first mode of operation corresponds to a first communication profile and said second mode of operation corresponds to a second communication profile.

4. The wireless communication terminal of claim 3, wherein said first and second communication profiles are selected from a group including cordless telephony profile, intercom profile, cellular profile, Bluetooth profile, Voice Over Internet Protocol profile, Wireless Local Area Network profile, Wireless Fidelity profile, and WiMAX profile.

* * * * *